Patented May 16, 1950

2,508,327

UNITED STATES PATENT OFFICE 2,508,327

METHOD OF MAKING LAMP BASING CEMENT

Cornelius J. Buckley, Salem, and Paul J. Hagelston, Danvers, Mass., assignors to Sylvania Electric Products Inc., Salem, Mass., a corporation of Massachusetts No Drawing. Application August 5, 1947, Serial No. 766,466

1 Claim. (Cl. 106—85)

This invention relates to electric lamps and more particularly to basing cement therefor.

In the manufacture of electric lamps and more particularly incandescent lamps of the type which are provided with a metal shell base, considerable difficulty has been encountered in developing a basing cement, for lamps designed to operate at high temperatures, which readily lends itself to high speed basing methods. For example, we have found this problem to exist in the case of lamps of the type which are installed in baking ovens, laboratory ovens, etc. In these installations the lamps are exposed, over long periods of time, to temperatures considerably higher than the temperatures to which an incandescent lamp is exposed in a normal domestic lighting installation. Consequently, the base and the cement which binds it to the lamp bulb are also subjected to abnormally high temperatures. The basing cement which is normally employed in basing incandescent lamps cannot withstand these high temperatures.

Lamp basing cement calculated to withstand high temperatures during lamp operation usually comprises a filler and a binder which are chemically mixed with water to form a mass of putty-like consistency. In mass production methods, large batches of this cement are prepared and large quantities of bases are filled in preparation for the actual lamp basing operation. From a practical point of view, it is sometimes necessary to prepare a batch of basing cement several hours before the base filling operation is performed.

A basing cement which has been found to give good results in basing lamps which, in operation, will be exposed to very high temperatures, comprises a filler such as zirconium silicate and a binder such as aluminum sulphate. However, the use of high speed lamp basing equipment has not been possible because a batch of it at ambient temperature will set in a very short time, due to the fact that the basing cement ingredients react chemically with water, and thus make it unfit for use. Consequently, it has been necessary to make very small batches and immediately base a small number of lamps. This procedure is slow, tedious and wasteful.

Accordingly, therefore, it is an object of this invention to provide a basing cement for lamps designed to operate at high temperatures which will not set in a short period of time at ambient temperatures.

Another object of this invention is to provide a basing cement for lamps designed to operate at high temperatures which will lend itself to high speed automatic machinery basing methods.

A further object is to provide a means for retarding the setting of the basing cement before the basing operation and still not weaken the bond between the base and the lamp after the basing operation has been performed.

Further objects, advantages, and features will be apparent from the following specification.

Our invention embodies the idea of treating the basing cement ingredients with a water repelling agent which will not react chemically therewith and which will break down at lamp basing temperatures and pass off without reacting chemically with the basing cement.

In the process of our invention the filler and the binder are thoroughly wetted with a water-repelling agent so that each particle thereof is contacted and provided with a protective water-repelling film. The filler and binder which has been treated with the water-repelling agent is then heated at a temperature high enough to dry it but not high enough to cause the water-repelling agent to break down. This provides a basing cement powder which is water-repelling. This treated powder may now be stored until one is ready to make a batch of basing cement.

In making a batch of basing cement, sufficient water is added to the treated powder to form a putty-like mass. The water will mix mechanically with the treated powder but will not react chemically therewith because of the protective film of water-repelling material with which each particle has been provided. Since the water-repelling agent prevents the water from chemically reacting with the basing cement matrix, setting of the matrix is thereby prevented. Thus large batches of basing cement may be prepared and permitted to stand for several hours without losing the putty-like consistency which is necessary for the proper "working" thereof during the base-filling operation.

As mentioned above, the water-repelling agent is one which will break down at lamp basing temperatures. Thus, when the lamp bases have been filled with the basing cement of our invention, and the lamp basing operation is performed, the heat applied to the base will break down the film of the water-repelling agent with which each particle of the basing cement powder has been provided and permit the water, which up to this point has only reacted physically with the basing cement, to react chemically with the basing cement and effectively lock the base to the lamp.

We have found water-repelling agents such as amino silane to give very satisfactory results.

In preparing a batch of basing cement in accordance with the method of our invention, one may waterproof the filler and the binder separately and then mix them together or one may mix the filler and binder together and then waterproof the mixture. After the basing cement powders (the filler and the binder) have been thoroughly wetted by the water-proofing agent so that each particle thereof has been provided with a protective film of water-proofing material, the treated powder is dried.

Satisfactory results are obtained when about 30 grams of zirconium silicate and about 3 grams of aluminum sulphate are treated with a water-repelling agent possessing the characteristics described above and mechanically mixed with sufficient water to give the mass a putty-like consistency. We have found about 5 cc. of water to be about the right amount to give this consistency. Larger quantities, of course, can be made, with satisfactory results, provided the ingredients thereof are mixed in substantially the same proportions as those just enumerated.

What we claim is:

A method of preparing a cement for basing electric lamps, said method comprising: wetting the basing cement matrix which comprises a mixture of about one part of aluminum sulphate and about ten parts of zirconium silicate with an amino silane; drying the basing cement matrix; and adding sufficient water thereto to form a mass of putty-like consistency.

CORNELIUS J. BUCKLEY.
PAUL J. HAGELSTON.

REFERENCES CITED

The following references are of record in the file of this patent:

UNITED STATES PATENTS

| Number | Name | Date |
|---|---|---|
| 1,283,546 | Olson | Nov. 5, 1918 |
| 1,548,616 | Kruger | Aug. 4, 1925 |
| 2,429,883 | Johannson | Oct. 28, 1947 |